United States Patent
Fernandez

(10) Patent No.: US 9,963,063 B2
(45) Date of Patent: May 8, 2018

(54) GEARED STRAP WINDING DEVICE

(71) Applicant: Ali Fernandez, Burbank, CA (US)

(72) Inventor: Ali Fernandez, Burbank, CA (US)

( * ) Notice: Subject to any disclaimer, the term of this patent is extended or adjusted under 35 U.S.C. 154(b) by 149 days.

(21) Appl. No.: 14/966,289

(22) Filed: Dec. 11, 2015

(65) Prior Publication Data
US 2017/0166106 A1  Jun. 15, 2017

(51) Int. Cl.
*B60P 7/08* (2006.01)

(52) U.S. Cl.
CPC ........... *B60P 7/0846* (2013.01); *B60P 7/0838* (2013.01)

(58) Field of Classification Search
CPC .......... B60P 7/0846; B60P 7/0838; B60P 7/08
See application file for complete search history.

(56) References Cited

U.S. PATENT DOCUMENTS

| | | | | |
|---|---|---|---|---|
| 4,311,288 A | * | 1/1982 | Galland | B65H 54/585 242/399 |
| 5,961,061 A | * | 10/1999 | Stanley | B60P 7/0846 24/545 |
| 2014/0110520 A1 | * | 4/2014 | Hampson | B60P 7/0846 242/395 |
| 2014/0138470 A1 | * | 5/2014 | Bunting | B60P 7/0846 242/390 |

* cited by examiner

Primary Examiner — Sang K Kim
(74) Attorney, Agent, or Firm — James A. Italia; Italia IP

(57) ABSTRACT

Provided is a strap rolling device for quickly and easily coiling items such as cargo straps. The apparatus comprising a base plate, a manual crank assembly, a strap reel assembly, a gear assembly and a chain for the gear assembly. The manual crank assembly is attached to the base plate, and is used to turn the gear assembly. The gear assembly enhances the rotational motion of the manual crank assembly, and is attached to the strap reel assembly, allowing the strap winder to perform the task of winding a cargo straps in a more efficient manner than can be done without gears. The apparatus contains hardware for mounting the device directly to a flat-bed truck with a clamp, or, in another embodiment, for mounting the device onto a stake hole.

7 Claims, 3 Drawing Sheets

GEARED STRAP WINDING DEVICE

CROSS-REFERENCE TO RELATED APPLICATION

This application claims benefit of the filing date under 35 USC § 120 of the filing date of U.S. Provisional Application Ser. No. 62/197,525 filed on Jul. 27, 2015, the contents of which are incorporated herein by reference.

STATEMENT RE: FEDERALLY SPONSORED RESEARCH/DEVELOPMENT (Not Applicable)

BACKGROUND OF THE INVENTION

The present invention relates generally to straps used to hold down cargo on trucks or trailers, and in particular to an apparatus for winding straps and cords after they have been used.

Strap rollers are well known in the art. They range in configurations from crank handles built into strap rollers to simple spool crank configurations. However, there are no strap rollers which employ a geared mechanism to increase the rate at which straps are rolled up for storage.

While known prior art continues to fill their respective, particular objectives and requirements, they do not disclose a geared strap roller apparatus.

Cargo straps are used with trucks and trailers to hold cargo in place while it is being transported. Truck drivers and other who deliver freight often work long hours, and, once their cargo is delivered, must roll up the cargo straps for their next use. Drivers are oftentimes exhausted at the end of a delivery, and must deal with less than ideal weather conditions. A device that rolls straps up more quickly than conventional methods is a boon for drivers, as any time saved when one is tired, or outdoors in inclement weather, is welcome progress.

Accordingly there is a need in the art for a device which can improve the speed at which one is able to roll cargo straps for storage.

The present invention addresses this particular need, as will be discussed in more detail below.

BRIEF SUMMARY OF THE INVENTION

The present invention addresses the above state situation by providing an apparatus for quickly rolling cargo straps. What is provided is an apparatus that can rapidly roll cargo straps with a uniquely designed gearing mechanism that increases the efficiency of other strap-rollers. The invention also provides for easy mounting and demounting to the flat-bed of a truck.

It is a feature of this invention to provide the operator of the device increased efficiency for winding cargo straps in comparison to using a winder that does not feature a gear, as well as the ability to mount the apparatus on a stake-hole or area of a flat-bed with suitable space for the clamping mechanism.

A further feature of the winder is that it may be attached to a flat-bed truck when straps need to be wound, and the winder may be detached for storage when not in use.

In accordance with one aspect of the invention, there is provided a strap winder. The strap winder includes a base plate, hardware for mounting the apparatus to a flat bed of a truck, a manual crank assembly, a strap reel assembly, a gear assembly, and a chain. The manual crank assembly attaches to the base plate, and includes a first tubular member that is attached securely to the base plate with a longitudinal slot extending through the first end, and manual crank extending therefrom. The strap reel assembly attaches to the manual crank assembly through a support member, and includes a second tubular member parallel to the manual crank tubular member; there exists a first end and a second end, with the second end including an elongate member that is received by the tubular member, with the other end including an assembly to attach and receive cargo straps. The gear assembly includes one larger diameter gear, and one smaller diameter gear, each with a plurality of evenly spaced teeth. The larger diameter gear is attached to the first end of the first tubular member through a bore hole on the gear, with a manual crank arm extending through said bore hole. The smaller diameter gear is attached on the first end of the second tubular member, and strap reel assembly is attached to the gear through the second tubular member. A chain wraps around both the larger and smaller diameter gears, which allows the reel assembly to turn at a ratio that is directly related to the ratio of the diameter of gears utilized.

BRIEF DESCRIPTION OF THE DRAWINGS

The features and advantages of the various embodiments disclosed herein will be better understood with respect to the following description and drawings in which like numbers refer to like parts throughout and in which.

DETAILED DESCRIPTION OF THE INVENTION

The detailed description that follows is intended to describe the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by a variety of different embodiments and that they are also intended to be encompassed within the scope of the invention.

Figure 1:
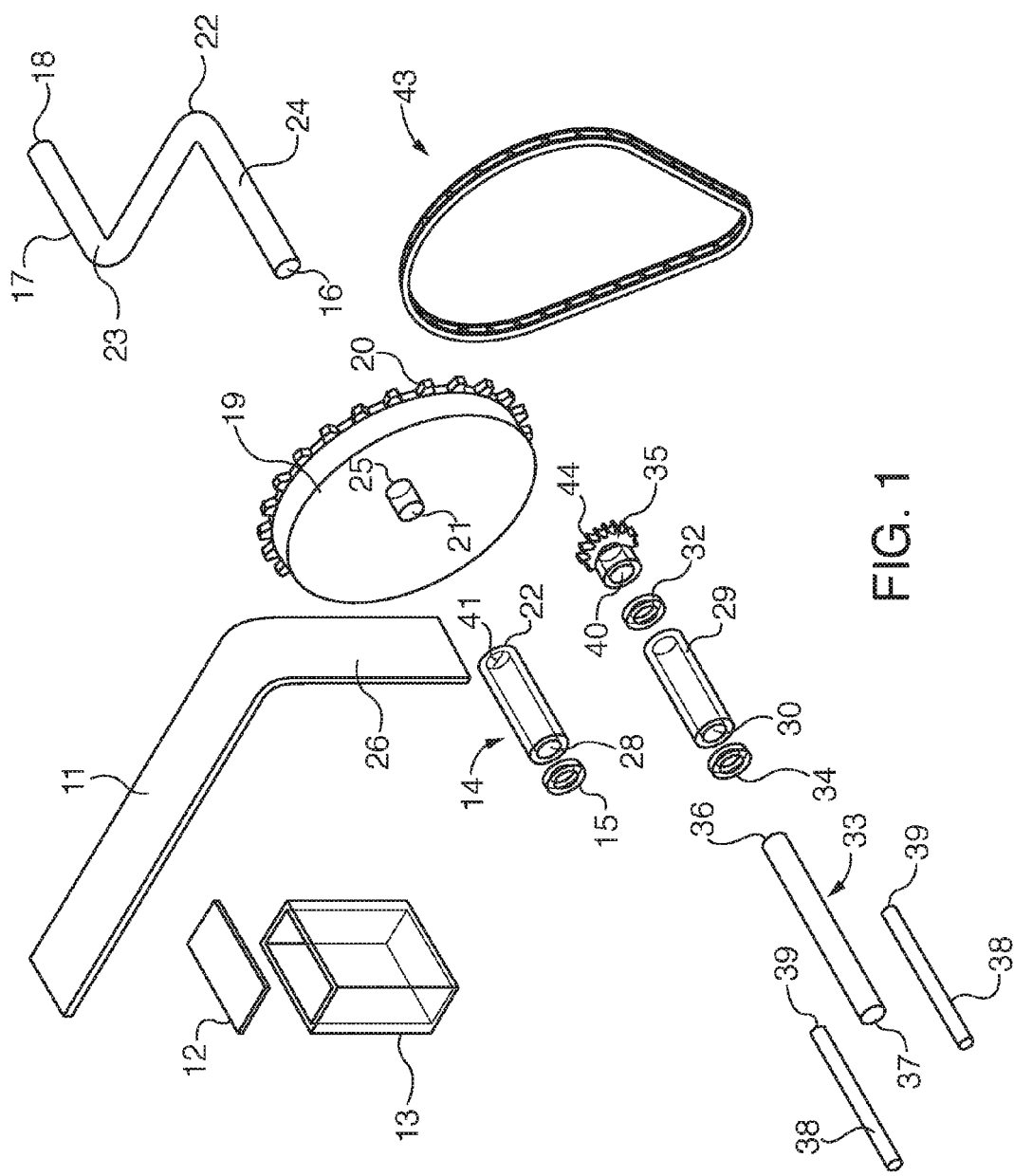
FIG. 1 is an exploded perspective of the strap winding device.

FIG. 1 shows the strap rolling device 10 in the preferred embodiment. The device 10 could be made of any suitably strong material, such as steel.

The device 10 includes a base plate 11 that has on one end a plate adapter 12 for stake hole mounting member 12.

A tubular member 14 attaches to the base plate 11. On one end of the tubular member 14 is a retaining cap 15 that attaches to one end 16 of the manual crank 17. The inner portion of the crank handle 24 is rotatably received through one side of the first tubular member 27 through the bore of the first tubular member 41 the other side 28 and is fastened to that end with the retaining cap 15. The manual crank 17 has a first bend 22, a second bend 23 and a handle 18. The larger gear 19 is attached to the inner portion of the crank handle 24 at one end an aperture on the gear 25. The other aperture 21 of the larger gear sits up against the first tubular member 14. The base-plate 11 is connected to a support member 26 at an angle, and the support member 26 connects to the second tubular member 29. On one end 31 of the tubular member 29 a spacer 32 sits between the smaller gear 35 and the end 31. An elongate member 33 is rotatably received through one opening 30 of the second tubular member 29 through the bore 42 and is attached to the smaller gear 35 on one end of the member 36 to the aperture in the gear 40. The opening of the second tubular member 30 also has a spacer 34 that has the elongated member 33 going through it. The elongated member 33 has two prongs 38 connected to it one end of the elongated member 37. The chain 43 attaches the larger gear's teeth 20 to the smaller gear's teeth 44 such that when the manual crank 17 is rotated about the longitudinal axis of the crank insertion 24 the smaller gear is turned at a ratio matching the ratio of the larger gear 19 to the smaller gear 35. When the manual crank 17 is turned, the prongs 38 will rotate, winding a strap that is attached to the prongs 38.

When the strap is completely wound, it may be removed from the hub and stored.

Figure 2:
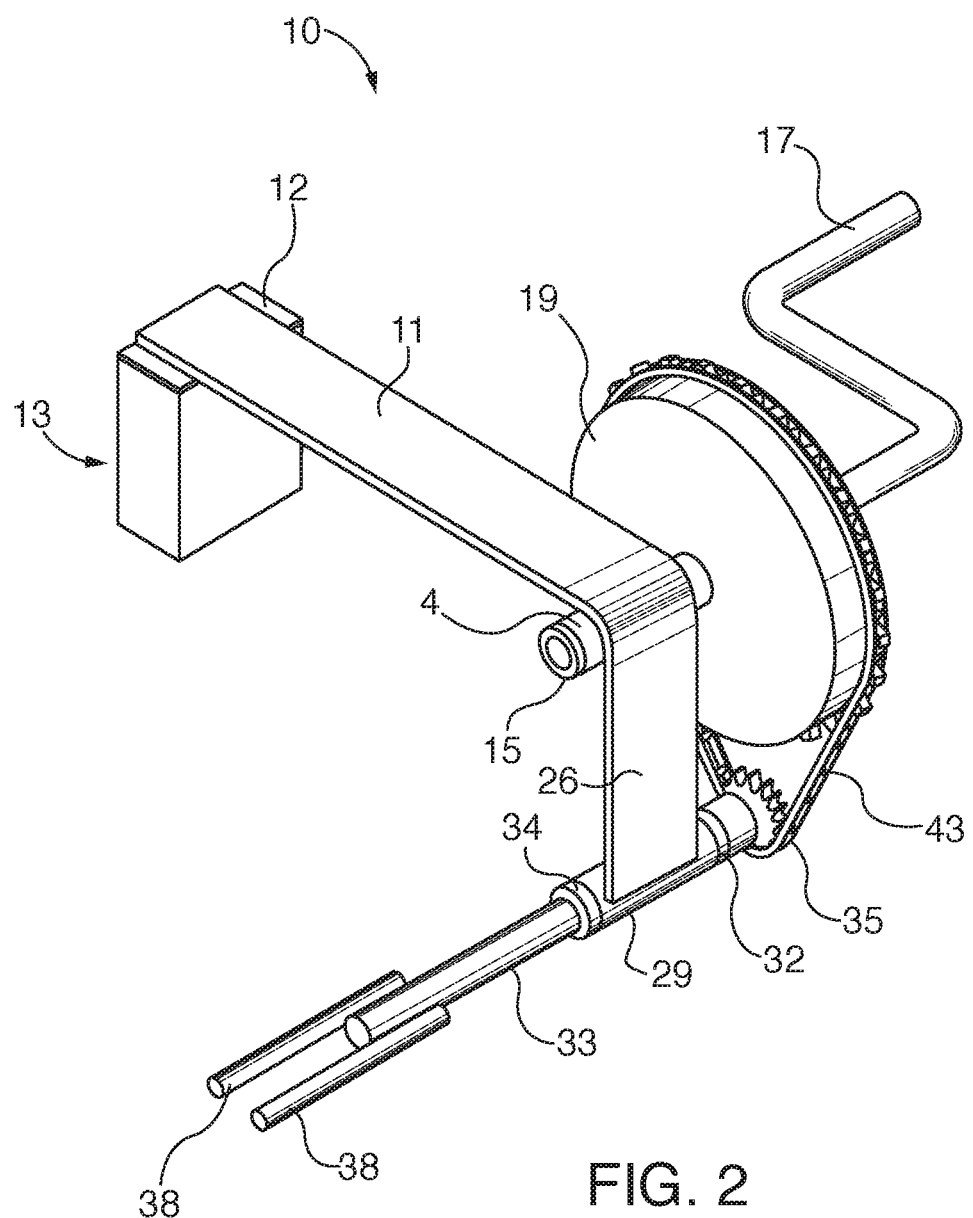
FIG. 2 is a perspective view of one embodiment of the strap winding device with stake mounting.
Figure 3:
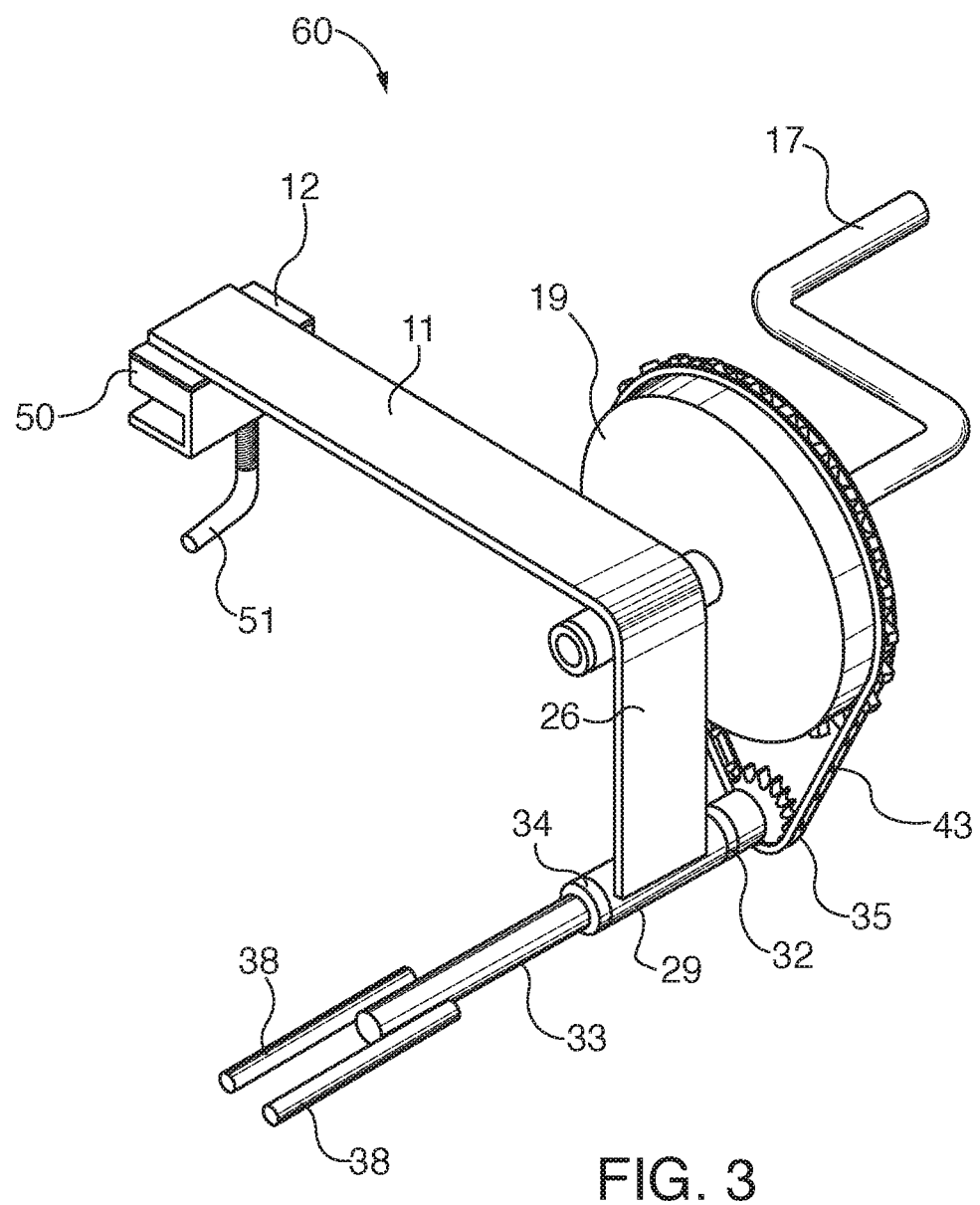
FIG. 3 is a perspective view of one embodiment of the strap winding device with clamp mounting.

A second embodiment 60, shown in FIG. 3, differs from the winder of FIGS. 1-2 in having a mounting clamp 50 that is attached to the plate adapter 12. A handle 51 for tightening the clamp 50 can be rotated to attach the device to any suitable location.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. Strap rolling device comprising:
   a base plate;
   hardwares for mounting device to a flat-bed of a truck on one end of the base plate;
   a manual crank assembly on the other end of the base plate, including a first tubular member with a first end and a second end attached securely to the base plate having a longitudinal slot extending through said first end, and manual crank arm extending therefrom;
   a strap reel assembly attached to said manual crank assembly through a support member, including a second tubular member parallel to said first tubular member, with a first end and a second end, with the second end including an elongate member received by the second tubular member, with the other end including an assembly to attach and receive cargo straps;
   a gear assembly with one larger diameter gear, and one smaller diameter gear, each with a plurality of evenly spaced teeth, with the larger diameter gear attached to said first end of said first tubular member through a bore hole on the gear, with the manual crank arm extending through said bore hole, and the smaller diameter gear attached on said first end of said second tubular member, and attached to the second gear through the second tubular member;
   a chain wrapping around both said larger diameter gear and said smaller diameter gear through the plurality of teeth.

2. The strap rolling device of claim 1, wherein said mounting hardware is a clamp.

3. The strap rolling device of claim 1, wherein said mounting hardware is a stake hole adapter.

4. The strap rolling device of claim 1, wherein the ratio between the larger gear and said smaller gear is between 10:1 and 2:1.

5. The strap rolling device of claim 1, wherein the ratio between the larger gear and said smaller gear is between 8:1 and 4:1.

6. The strap rolling device of claim 1, wherein the assembly to attach and receive cargo straps is a two-pronged fork.

7. The strap rolling device of claim 1, where in the assembly to attach and receive cargo straps is a V-shaped prong.

* * * * *